United States Patent [19]

Teglovic et al.

[11] Patent Number: 5,692,030
[45] Date of Patent: Nov. 25, 1997

[54] ELECTRONIC INTERFACE FOR EXCHANGE OF TROUBLE ADMINISTRATION INFORMATION IN TELECOMMUNICATIONS

[75] Inventors: Eugene William Teglovic; Mary Marguerite Oglesby, both of Colorado Springs; Bruce Kettle; Susan Ann Weese, both of Monument, all of Colo.

[73] Assignee: MCI Communications Corporation, Washington, D.C.

[21] Appl. No.: 454,732

[22] Filed: May 31, 1995

[51] Int. Cl.$^6$ .................. H04M 3/00; H04M 3/08; H04M 7/00

[52] U.S. Cl. .................. 379/14; 379/34; 379/229; 370/250; 370/252

[58] Field of Search .................. 379/1, 9, 10, 11, 379/12, 13, 14, 15, 22, 23, 26, 32, 34, 207, 229, 221, 230; 370/13, 73.1, 14, 17, 58.2, 85.13, 85.14, 241, 244, 250, 252; 395/182.02, 185.01, 185.1

[56] References Cited

U.S. PATENT DOCUMENTS

| | | | |
|---|---|---|---|
| 4,464,543 | 8/1984 | Kline et al. | 379/10 |
| 4,862,492 | 8/1989 | Zwick | 379/32 |
| 5,049,873 | 9/1991 | Robins et al. | 379/14 |
| 5,101,400 | 3/1992 | Krantz | 370/13 |
| 5,359,646 | 10/1994 | Johnson et al. | 379/26 |
| 5,426,688 | 6/1995 | Anand | 379/10 |
| 5,450,394 | 9/1995 | Gruber et al. | 370/17 |
| 5,475,732 | 12/1995 | Pester, III | 379/1 |
| 5,479,473 | 12/1995 | Zey | 379/15 |
| 5,490,199 | 2/1996 | Fuller et al. | 379/34 |
| 5,566,162 | 10/1996 | Gruber et al. | 370/17 |
| 5,566,223 | 10/1996 | Taguchi | 370/13 |
| 5,568,471 | 10/1996 | Hershey et al. | 370/17 |

OTHER PUBLICATIONS

Network Reliability Test Program is Under Way, Phillips Business Information, Inc. Aug. 1992.

AT&T Says Sonet Products Scheduled for Late 1990S, Capitol publications, inc. May 1991.

MCI's Integrated Network Management Service Will Act as Element of Netveiw, Data trends publications, inc. Nov. 1989.

*Primary Examiner*—Curtis Kuntz
*Assistant Examiner*—Paul Loomis

[57] ABSTRACT

Telecommunications electronic interface exchanges trouble administration information between a long distance carrier and a Telco site. The interface provides fast and cost-effective electronic transmission of problem information with little or no changes to the current operating procedures, eliminating the need for manually calling each other's personnel to enter the information needed to open a ticket on their respective trouble management systems. This electronic exchange of information will insure the timely and accurate distribution of problem information to all concerned parties. This interchange of information occurs via an industry standardized transportation and data format. Standards compliance allows easy implementation of the electronic interface with all companies which are likewise compliant.

10 Claims, 4 Drawing Sheets

| LAYER | TYPE | ISO/CCITT STANDARDS | |
|---|---|---|---|
| 7 | APPLICATION | CMISE-ISO 9595/CCITT X. 710, CMIP – ISO 9596-1/CCITT X. 711, ISO 9596-2/CCITT X. 712 | |
| | | ACSE- ISO 8649/CCITT X.217, ISO 8650/CCITT X.227, ISO 8649-1, ISO 8650-1 | ROSE-ISO 9072-1/CCITT X.219, ISO 9072-2/CCITT X.229 |
| 6 | PRESENTATION | ISO 8824/CCITT X.208-ASN.1, ISO 8825/CCITT X.209-BER, ISO 8822/CCITT X.216, ISO 8823/CCITT X.226 | |
| 5 | SESSION | ISO 8326/CCITT X.215, ISO 8327/CCITT X.225 | |
| 4 | TRANSPORT | ISO 8072/CCITT X.214, ISO 8073/CCITT X.224 | |
| 3 | NETWORK | ISO 8878, ISO 8208, CCITT X.25, CCITT X.75, CCITT X.223, CCITT X.213, CCITT X.244 | |
| 2 | DATA LINK | ISO 7776/CCITT X.121 LAP-B | |
| 1 | PHYSICAL | CCITT V.35, V.28, V.24 | |

FIG. 3

| FUNCTIONAL UNIT | SERVICE | FUNCTIONS |
|---|---|---|
| KERNEL | PT-CREATE ON TELECOMMUNICATIONS TROUBLE REPORT OBJECT | ENTER TROUBLE REPORT |
| KERNEL | PT-GET ON TELECOMMUNICATIONS TROUBLE REPORT OBJECT | REQUEST TROUBLE REPORT STATUS |
| ADD TROUBLE ADMINISTRATION INFORMATION | PT-SET ON ADDITIONAL TROUBLE INFORMATION LIST ATTRIBUTE IN TELECOMMUNICATIONS TROUBLE REPORT OBJECT | ADD TROUBLE REPORT REMARKS |
| MODIFY TROUBLE ADMINISTRATION INFORMATION | PT-SET ON TELECOMMUNICATIONS TROUBLE REPORT OBJECT | MODIFY TROUBLE REPORT |
| VERIFY TROUBLE REPAIR COMPLETION | PT-SET ON CLOSE OUT VERIFICATION ATTRIBUTE IN TELECOMMUNICATIONS TROUBLE REPORT OBJECT | CLOSE TROUBLE REPORT |
| CANCEL TROUBLE REPORT | PT-SET ON CANCEL REQUESTED BY MANAGER ATTRIBUTE IN TELECOMMUNICATIONS TROUBLE REPORT OBJECT | CANCEL TROUBLE REPORT |
| TROUBLE ADMINISTRATION CONFIGURATION EVENT NOTIFICATION | PT-EVENT-REPORT | UPDATE TROUBLE REPORT INFORMATION WHEN AN ATTRIBUTE VALUE CHANGES |

FIG. 4

ELECTRONIC INTERFACE FOR EXCHANGE OF TROUBLE ADMINISTRATION INFORMATION IN TELECOMMUNICATIONS

FIELD OF THE INVENTION

This invention relates to a telecommunications system and, in particular, a telecommunications electronic interface between trouble management systems of a long distance carrier and a local telephone company for facilitating the administration of service or product related troubles reported by customers.

BACKGROUND OF THE INVENTION

A marketing research in telecommunications has found that network management remains the number one technical issue for customers. The research verified that network management services offered by carriers are one of the top decision-making factors in choosing a carrier. Among several network management functions, fault management is clearly the most important network management capability desired by the customers.

The ability of the carrier to quickly identify, record, track and resolve reported trouble events in a telephone product or service is critical to the customer satisfaction. Reduction of repair time improves customer perception of service leading to overall customer satisfaction and a subsequent increase in revenues for the carrier.

Trouble ticket operations are a subset of fault management relating to the resolution of the fault. A trouble ticket is a registered instance of a trouble handled by the carrier. A customer can open, change, close, or refer a ticket back to the carrier. The ticket is typically opened for a specific circuit or phone number (e.g., 800/900 numbers).

Generally, a long distance carrier exchanges information on trouble administration manually over the telephone with Telco sites, such as Regional Bell Operating Companies (RBOC) and Local Exchange Carriers (LEC) (all three terms used interchangeably in the specification). Manual phone calls must be exchanged between the long distance carrier and RBOC/LEC network management personnel when, for example, the trouble occurs at RBOC/LEC but is reported to the long distance carrier by its customer. This method is labor intensive, error prone, and slow. A need therefore exists for a fast, efficient and cost-effective way to transfer the trouble administration information between the long distance carrier and the Telco site.

To improve the process, an electronic interface is provided for an exchange of information on trouble administration between a long distance carrier and a Telco site.

OBJECTS OF THE INVENTION

It is therefore an object of the invention to electronically exchange information between a long distance carrier and RBOC/LEC.

It is another object of the invention to reduce the time to repair troubles in RBOC/LEC or long distance carrier's circuits.

It is yet another object of the invention to report and track the telephone service or product trouble electronically over the interface.

It is still another object of the invention to eliminate manual telephonic reporting of a trouble, reducing repair time and increasing customer satisfaction.

SUMMARY OF THE INVENTION

These and other objects, features and advantages are accomplished by an electronic interface which will reduce cost, increase efficiency, limit manual calls and improve customer service.

The disclosed invention includes a gateway comprising a processor which communicates via a seven-layer protocol processing stack, which includes a Unix-based X.25 processing code and a Manager/Agent application. The gateway is developed in accordance with industry telecommunications standards. Specifically, it complies with the American National Standards Institute (ANSI) T1.227/.228 standard, developed by the North American Telecommunications Standards Committee (T1), as well as the International Standards Organization (ISO) Open System Interconnection (OSI) seven layer model which uses the Common Management Information Protocol/Common Management Information Service Element (CMIP/CMISE).

The operations systems (OS) of the long distance carrier and the RBOC/LEC communicate via their respective gateways. When a customer reports a trouble, a technician opens a trouble ticket in the long distance carrier's trouble administration system, such as Trouble Management System (TMS) or Customer Service Manager (CSM). An interface for TMS, such as trouble management system standardized interface (TMS/SI), then converts the information embodied by the trouble ticket from the Trouble Management System format to the ANSI-defined T1M1.5 T1.227/.228 data model understandable by the gateway.

The TMS Standardized Interface will interrogate the data to insure proper format, completeness and data validity. Valid data is applied to the existing TMS databases for subsequent processing. Invalid data is returned to the sender. The TMS/SI is responsible for transmitting the appropriate responses back to the gateway so that the information can be transmitted to the correct RBOC/LEC.

The trouble administration information is communicated between gateways over an OSI seven layer stack with CMIP/CMISE running over a packet-switched X.25 data network. The data will then be transported via X.25 connection between the long distance carrier and the RBOC/LEC. For data going to the RBOC/LEC, the gateway will format the information into the industry standard OSI CMIP/CMISE. Data going into the direction of the TMS/SI will be formatted into a structure that is understandable by the TMS Standardized Interface.

DESCRIPTION OF THE PREFERRED EMBODIMENTS

The disclosed electronic interface for trouble administration electronically opens and tracks trouble report information. The disclosed invention reduces the number of manual phone calls exchanged between the long distance carrier and the RBOC/LEC network management personnel when, for example, the trouble occurs at the RBOC/LEC but is reported to the long distance carrier by its customer. Performance monitoring is expected to be an added benefit as the industry moves towards quality service assurance. Due to the various number of trouble tracking systems in use in the telecommunications community, it was determined that the ANSI T1M1.5 T1.227 and T1.228 standards will best facilitate a common data format for this interface which is constructed as a standards-based platform. The standards provide the flexibility to functionally interface multiple combinations of Telco sites and long distance carriers.

To eliminate the redundant description of the invention, the interface between the RBOC/LEC and the long distance carrier will be described with reference to the data flow only in the direction of the RBOC/LEC. In this case, the long distance carrier will act as the Manager of the trouble ticket and the RBOC/LEC will act as the Agent. The Manager tells the Agent what needs to be done, and the Agent is responsible for correcting the problem. It is understood, however, that the RBOC/LEC may also act as the Manager while the long distance carrier plays the role of an Agent.

Figure 1:
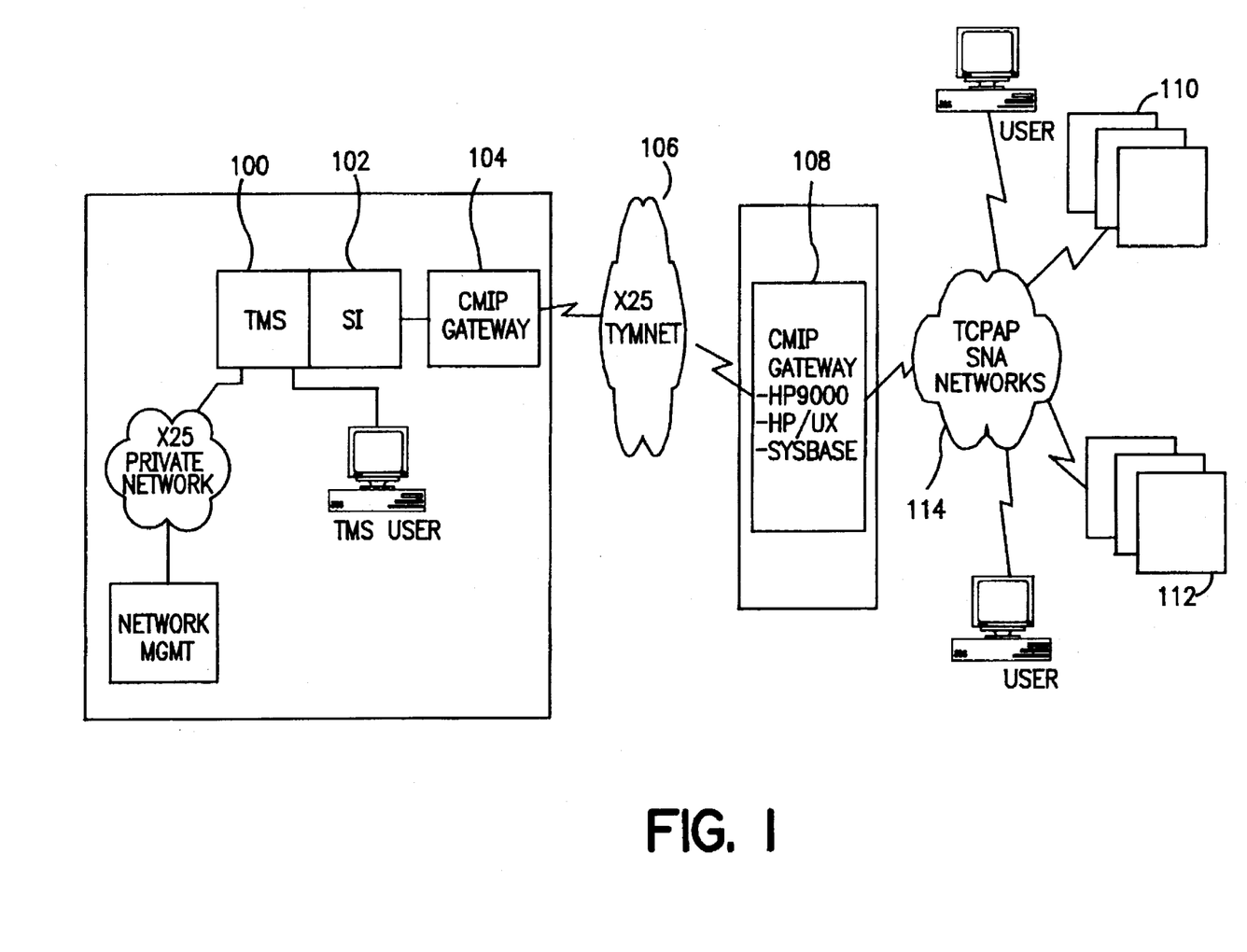
FIG. 1 illustrates an operating environment for the electronic interface between a long distance carrier and a LEC.

Each Agent's Operations System (OS) will be the principle user for the disclosed electronic interface, creating an Operations System to Operations System (OS—OS) communication. As shown in FIG. 1, this communication flows from the Manager's trouble management system 100 via the trouble management system Standardized Interface 102. The communication then enters the Manager's gateway 104 transporting it across a communications interconnect 106. The communication then continues through the Agent's gateway 108 to the Agent's trouble management systems 110 or 112 via the communications protocol 114.

The electronic exchange of trouble administration information supports the ANSI T1M1.5 T1.227 and T1.228 standards, developed by the North American Telecommunications Standards Committee (T1). In addition, various ANSI ITU-T and ISO standards are used to define communication protocols and functional profiles.

Furthermore, the communication protocol used for this interface is based on the International Standards Organization (ISO) Open System Interconnection (OSI) seven layer model using the Common Management Information Protocol/Common Management Information Service Element (CMIP/CMISE).

Next, a more detailed architecture is described for the electronic exchange of information between a long distance carrier and a Telco site. As identified in FIG. 2, the operations systems (OS) of the long distance carrier and the RBOC/LEC communicate via their respective gateways 104 and 108.

Figure 2:
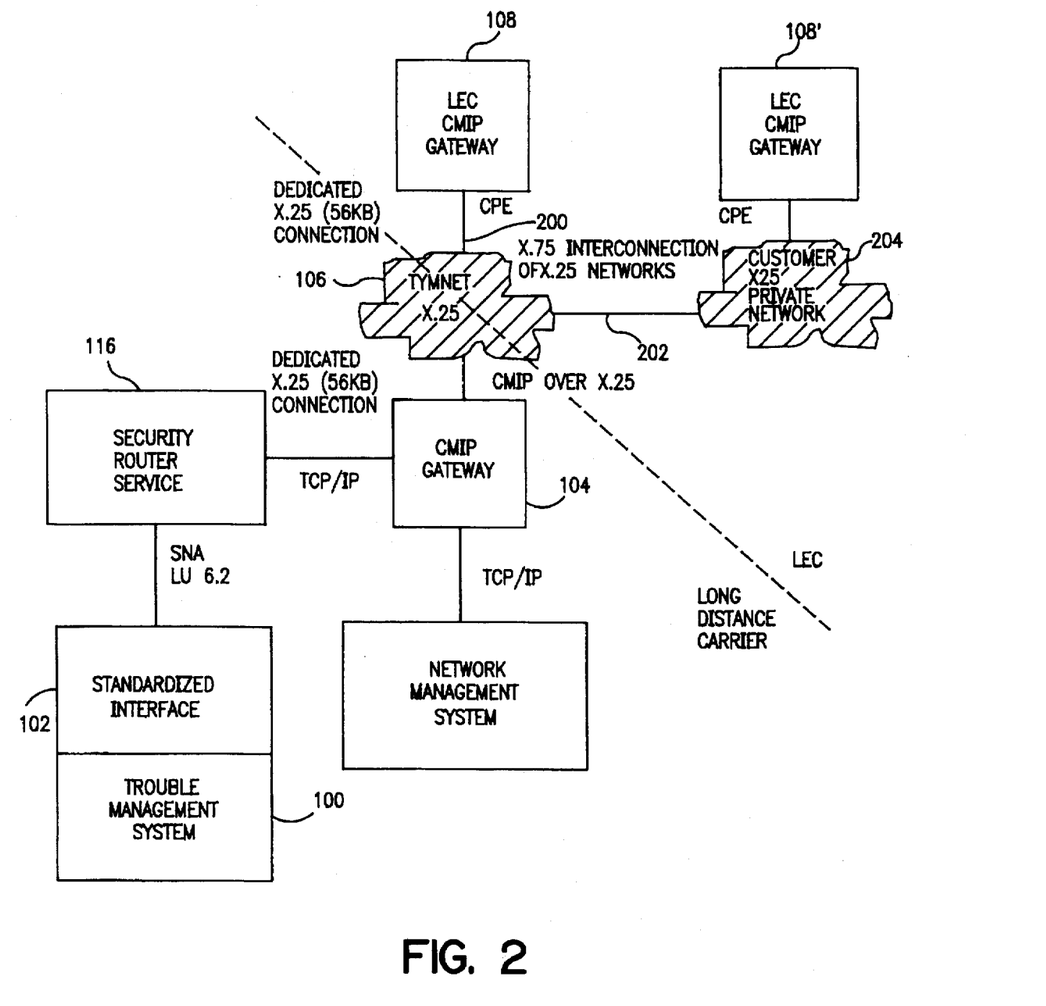
FIG. 2 illustrates a customer connection architecture for the disclosed interface.

In the architecture of the long distance carrier, a technician opens a trouble ticket based on a call-related trouble reported by a customer. The long distance carrier's trouble management system or customer service manager 100 (used interchangeably in this specification) is a centralized application providing fault management capabilities, for example, 24 hours per day, 7 days per week for all products and network services. This estimate does not include weekly standard maintenance requirements, nor periodic downtime for software migrations. The trouble management system 100 may reside, for example, in an IBM mainframe environment, utilizing application programs, databases and programming environments such as DB2, CICS, and COBOL II, for example.

The Trouble Management System Standardized Interface (TMS/SI) 102 comprises processing means for preparing a proper data exchange between the TMS application and the gateway 104. The TMS/SI 102 performs all data conversions to ANSI T1M1.5 T1.227 and T1.228 standards. The TMS Standardized Interface 102 will interrogate the data to insure proper format, completeness and data validity. Valid data is applied to the existing TMS databases. Invalid data is returned to the sender. The TMS/SI 102 is responsible for transmitting the appropriate responses back to the gateway 104 so that the information can be transmitted to the correct RBOC/LEC.

The TMS/SI 102 may be a mainframe-based application implemented on an IBM 3090 general purpose computer, for example. The logical design components comprise the following elements:

1) Trouble Ticket Data Converter—The Converter will repackage the data being sent to and from the TMS 100. It utilizes the AGENT/TMS Conversion Matrix and the AGENT/TMS Reference databases to get both field enhancement and field adjustment information.

2) Trouble Ticket Data Editor—The Editor serves as a validation point for both incoming and outgoing data. It works to ensure that requests are complete prior to being sent into either the TMS 100 or the AGENT's trouble management systems 110 or 112.

3) Application Recovery Module (ARM)—The ARM function will manage re-start and re-send processes within the TMS/SI 102. When a process fails, data is recovered from the TMS/SI archive at the last successful process point and re-introduced into the process flow.

4) Data Access Manager—The Data Access Manager controls the access calls to all local databases associated with the TMS/SI 102. The database tables are:
   a. AGENT/TMS Protocol Matrix which will hold data related to communication protocols of incoming Agents to the TMS 100;
   b. AGENT/TMS Security Matrix which will contain information to pre-screen the Agents' request for access and authorized activity.
   c. AGENT/TMS Data Conversion Matrix which will contain information to both convert incoming requests into TMS-valid formats and to re-package outbound messages to the Agents required format.
   d. AGENT/TMS Reference Data which will contain all other related information that will allow outside Agents the ability to communicate and receive messages to and from the TMS 100.

5) TMS/SI System Toolbox which is a collection of tools and facilities that will aid the TMS support organization in monitoring and researching any and all data passed through and enhanced by the TMS Standardized Interface 102.

6) Security Module which will verify the Agent and its functional authority within the Trouble Management System 100. It will access the Security information housed within the AGENT/TMS Reference database 116.

The trouble administration information is communicated between the gateways 104 and 108 over an OSI seven layer stack with CMIP/CMISE running over X.25 network 106. For data going to the RBOC/LEC, the gateway 104 will format the information into the industry standard OSI CMIP/CMISE. Data that is going into the TMS/SI 102 will be formatted into a structure that is understandable by the TMS 100.

As illustrated in FIG. 2, the gateway 104 of the long distance carrier can communicate with multiple Telco sites via the gateways 108, 108', etc. The gateways 104 and 108 are general purpose computers, such as Hewlett Packard 9000/755, for example, having a Unix-based X.25 processing code and a Manager/Agent application as described below.

FIG. 2 shows two types of X.25 connections being supported in the disclosed invention. The first type is a dedicated connection 200 between the long distance carrier and the LEC over a Tymnet X.25 network 106 running at 56 KBit/sec. The long distance carrier and the RBOC/LEC will be directly connected to the Tymnet 106. The second will be constructed using X.75 link 202, which is an interconnection of X.25 networks, between the Tymnet 106 and a private X.25 network 204 of the LEC. This architecture gives TMS users the ability to perform trouble administration using existing procedures and to communicate with Telco sites electronically over an open, standard-based interface.

The following list characterizes communication between a carrier and a Telco site:

1) Leased dedicated private X.25 connections over Tymnet are supported.

2) X.75 Interconnection of X.25 networks is supported.

3) Gateway-to-Gateway communications are provided over a seven layer OSI stack.

4) The objects exchanged between gateways are defined in ANSI T1M1.5 T1.227.

5) The services supported between gateways are defined in ANSI T1M1.5 T1.228.

The communications between the long distance carrier and the RBOC/LEC exists over an OSI seven layer stack. International standards for OSI are intended to support the communications requirements of applications requiring coordinated processing activities in two or more open systems. OSI uses the concept known as layering, in which relatively simple service may be augmented to offer more powerful services at the layer immediately above it.

Figure 3:
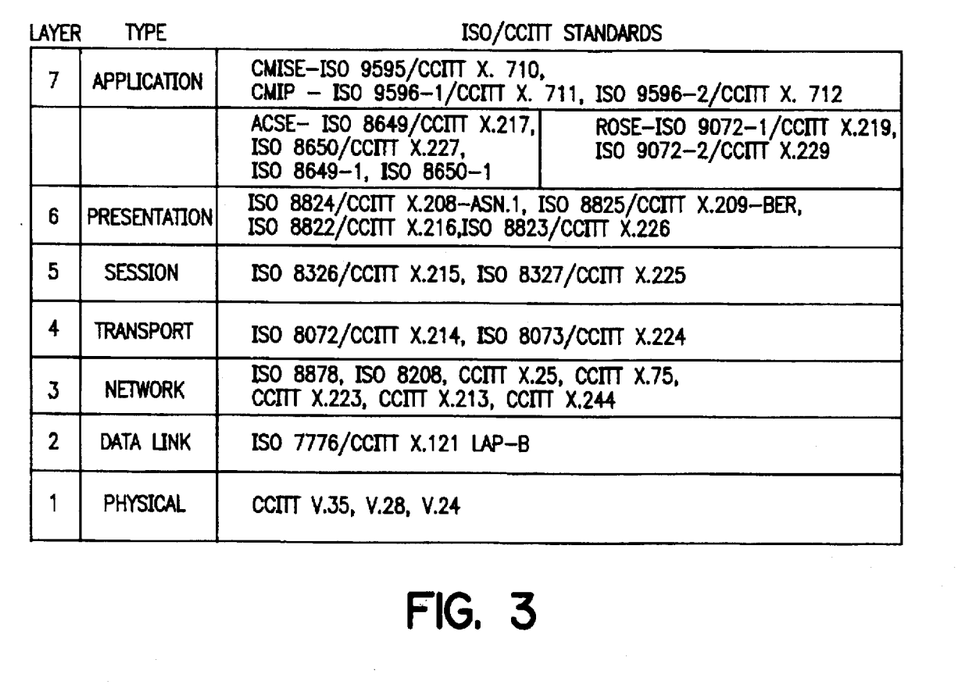
FIG. 3 illustrates an OSI protocol stack for communication between the systems.

The OSI model divides the task of computer communications into seven functional layers. The first four OSI layers form the lower-layer infrastructure of the OSI model. These provide the end-to-end services responsible for data transfer. The remaining three OSI layers form the upper layer infrastructure of the OSI model. These provide the application service responsible for information transfer. FIG. 3 identifies ISO and CCITT standards that must be supported at each layer of the OSI stack.

As stated above, the TMS application allows for the trouble reporting, tracking, and resolution of customer problems via one centralized system. Appropriate screen functionality is included in the TMS application for entering Manager-supplied trouble report information, displaying the Agent-supplied trouble report information, and displaying the Agent status.

Figure 4:
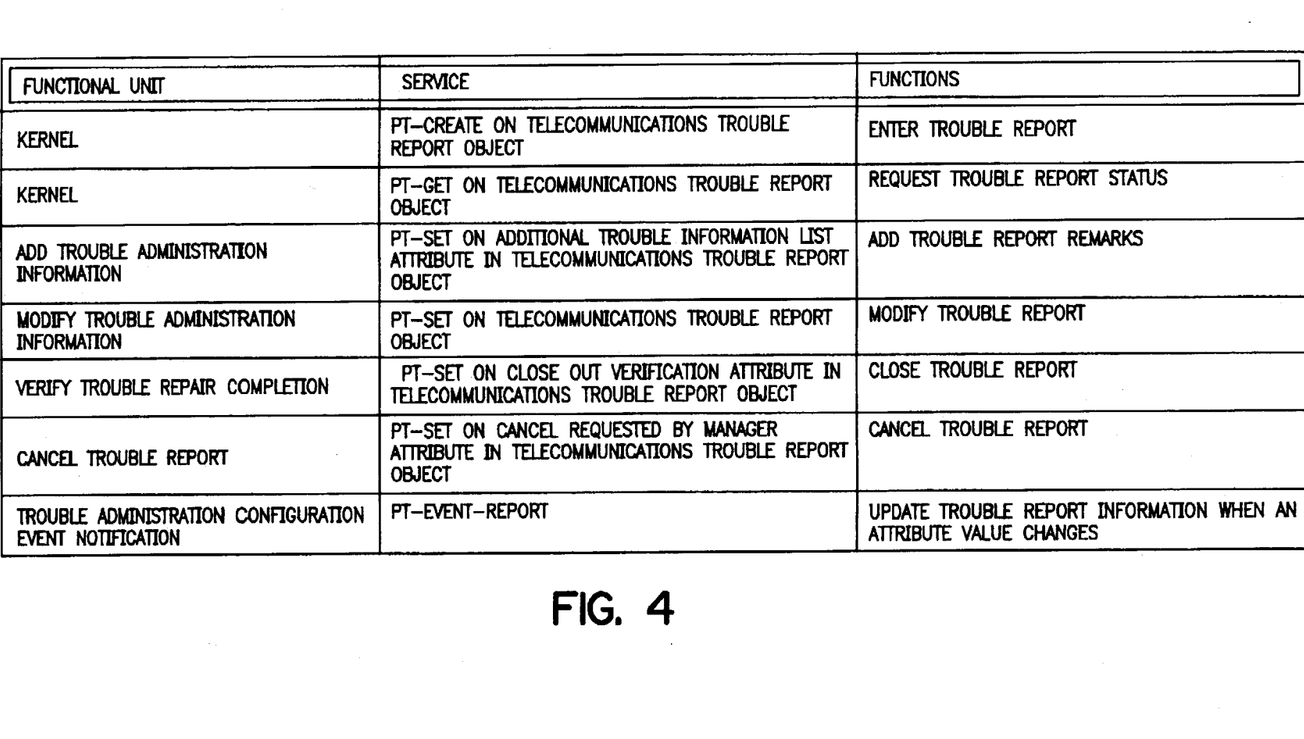
FIG. 4 illustrates a table depicting the relationship between the functional units, services and functions implemented in a gateway.

The disclosed electronic interface between the long distance carrier and the LEC will support a subset of trouble administration functions performing services defined in terms of functional units in the ANSI T1M1.5 standard. FIG. 4 shows the relationship between the functional units, services and functions implemented in the gateway which are described below.

The long distance carrier's personnel open trouble tickets on the TMS 100. When it is determined that the trouble requiring attention is under the jurisdiction of a LEC, the long distance carrier's personnel refer out the ticket to the LEC. Using the disclosed electronic interface, the "refer out" process results in transmission of messages from the TMS 100 through the TMS Standardized Interface (TMS/SI) 102 to the Manager's gateway 104. The TMS/SI 102 and the Manager's gateway 104 work together to format the messages according to T1M1.5 standards.

The Manager's gateway 104 then sends the messages to the LEC's gateway 108 which forwards the messages to their host trouble management systems 110 and 112 to create a trouble ticket opened by the long distance carrier.

As the Manager, the long distance carrier will request the creation of a trouble report on the Agent's system using the Kernel functional unit. This is accomplished by the PT-CREATE service on the Telecommunications Trouble Report object. For merely illustrative purposes, the required manager-supplied attributes belonging to this object class are the following. It is understood that other attributes may be used:

additionalTroubleInfoList
managedObjectInstance
troubleType

As part of the instantiation of a trouble report, the Agent will supply values for the following attributes shown as merely an example:

receivedTime
troubleFound
troubleReport
troubleReportState
troubleReportStatus
troubleReportStatusTime
agentContactPerson The Request Trouble Report Status function of the T1M1.5 functional unit supports the Status from the Local Exchange Carrier business requirement. As the Manager, the long distance carrier can request the status of a trouble report on the Agent's system at any time throughout the active life cycle of the trouble report. This is accomplished by the PT-GET service using the Telecommunications Trouble Report object.

The Add Trouble Report Remarks function provides additional information pertaining to the trouble throughout the active life cycle of the trouble report. As the Manager, the long distance carrier will request the Agent to add additional descriptive text for an open trouble report on the Agent's system using the Add Trouble Information functional unit. PT-SET service will then be issued on the Additional Trouble Information List attribute in the Telecommunications Trouble Report object.

The Manager will request the modification of a trouble report in the LEC's system when changes to attributes pertinent to the resolution of the trouble require communication. The Manager's modifications will include support for escalation of trouble reports and authorization of repair activities. The escalation request of a trouble report is based on Manager/Agent agreement.

Further in the managerial capacity, the long distance carrier will verify whether the repair of a trouble report is completed to its satisfaction using the Verify Trouble Repair Completion functional unit on all trouble reports. The trouble report will remain open prior to this request and will remain in closedAwaitingCustomerVerification status in the Agent's system until verification is received from the Manager.

Once the trouble report is resolved by the LEC, the LEC will request that the long distance carrier verify the trouble report closure. The long distance carrier will ensure that the repair was made to its satisfaction and then send a verification back to the LEC that the trouble report can be closed.

Cancel Trouble Report function defined by the standards is also supported.

Further according to the invention, the Manager requires receipt of unsolicited notifications from the LEC when the Agent changes the status or commitment time attributes, or any of a list of selected attributes. The Agent will supply an unsolicited status notification using the Trouble Administration Configuration Event Notification functional unit.

Users of the disclosed interface require handling of the referral, status, escalation, customer time, and clearance of a trouble ticket concerning the LEC in a similar manner as referrals to other long distance carrier's terminals in the Trouble Management System 100. In other words, the RBOC/LEC would appear to the user of the TMS 100 as just another "terminal" on the network. This will improve customer service due to the reduced manual intervention resulting in improved speed and accuracy of the trouble handling process between the two organizations.

Although the TMS 100 should be programmed to an industry standard, it has to handle different RBOC/LEC systems presenting only one format and one set of procedures for the employees to use and follow.

Conversations on the phone with any RBOC/LEC during the life of a trouble ticket involves five major transactions between the long distance carrier and a Telco site. The disclosed electronic interface follows similar patterns and functions as the verbal system currently in use. The long distance carrier and Telco's technicians would not have to use different procedures to refer a trouble ticket to the Telco electronically. The following transactions would have to be handled electronically over the interface:

1. Referral to the LEC
2. Status from the LEC
3. Referral into/out of Customer Time
4. Escalations
5. Clearance and Retest Referral To LEC Transaction: A technician at the Manager's system decides to refer an existing trouble ticket to the Agent's system. Transmitted electronically to the Agent's system, the information includes: Customer name; Customer contact; Access hours at the customer premise; LEC circuit ID; TMS ticket number; Trouble description; Remarks as necessary; Telco ID Number; and the long distance carrier's circuit ID.

Most of this information have been entered into the Manager's databases prior to initiation of the referral. The information that exists in the databases is displayed on the TMS screen. The technician would then add any missing information, edit any erroneous information, and verify the information before it is transmitted to the LEC. The technician should be able to refer the ticket to the LEC as if the ticket is referred to another long distance carrier's site by filling out the appropriate sections on the screen.

If electronic transmission to the LEC is not possible, then the system should give the technician an appropriate message on the TMS screen advising the technician to call the LEC and refer the trouble ticket manually. Electronic transmission may not be possible for several reasons, including the link to the LEC may be down, the LEC may not be on the electronic referral system, etc. In addition, some small LECs may never be part of the electronic referral system.

The information transmitted to the LEC electronically would then be used by the LEC to create a ticket for the LEC's use in its own trouble management system 110 and 112.

The LEC would then acknowledge receipt of the ticket by assigning a ticket number in their system and transmitting this ticket number back to the long distance carrier. Both systems would have to store both system's trouble ticket numbers for easy cross reference.

When the LEC acknowledges the receipt of a ticket by assigning a ticket number in their system, the TMS 100 should record this number on the ticket, and make it available to both List Status and Escalate functions reported by the LEC.

Status from the LEC Transaction: The electronic system should simplify getting status from the LEC. Anytime the LEC makes any change to their ticket or adds remarks to their ticket, this should trigger an automatic update in the TMS ticket to add the new information to the TMS ticket.

Currently, the long distance carrier gets a status on a ticket only if it or the LEC calls the other via the telephone. The disclosed system would make the recording of the status automatic and immediate.

The status from the LEC includes: Service Provider; Name/ID of the LEC; Real time remarks on status; Date and time stamp for the remarks; Initials of individual entering the status; Estimated time of repair; If trouble has not been isolated, where Telco is in the trouble resolution process (part of the remarks section); If trouble has been isolated, what caused the trouble; If a dispatch is required, estimated time of arrival of the technician; If the trouble has been referred to another department or telephone company, the name, date, time, and telephone number of the person accepting the referral; and Internal LEC escalation level.

Referral into/out of Customer (or Telco) or Stop Time Transaction: The rules controlling the use of customer time are strictly controlled by the long distance carrier. When the technician places a ticket that has been referred to a LEC into customer time, a message should be sent by the TMS 100 to the LEC. The LEC would optionally use this message to place its ticket in "stop" time. When the technician removes the trouble ticket from customer time, the TMS 100 should send another message to the LEC system to notify the LEC that "stop" time has ended.

Within the TMS 100, the long distance carrier will calculate the LEC ticket outage time from the time that it sends a ticket to the LEC system until the ticket closure from the LEC is received and verified.

Escalation Transaction: Escalations will occur electronically over the Interface, and the Manager may occasionally accompany the Automatic Escalation with a phone call to the LEC. The Escalation lists defined in the T1M1 ANSI standard will be provided on a per trouble ticket (Trouble Report) basis. When an escalation occurs, the escalation information will be transferred across the interface to inform the Manager and to provide the Manager with sufficient information to call the individuals who received the escalation notice. This will ensure that the Manager has the current escalation status and allows to perform escalations remotely. This will facilitate, for example, after hours escalations to the LEC by a remote terminal or a data test center.

Clearance and Retest Transaction: Once the LEC has worked and fixed the problem, an electronic notice will go from the Agent to the Manager indicating that the problem has been fixed. At this point, the Manager will verify the repair before confirming closure to the LEC.

The final clearance transaction will have to be approved by a technician via the TMS 100 before the ticket is considered officially closed. If the circuit is not verified as repaired, then the TMS 100 will reject the request for clearance until verification occurs.

Remarks Partitioning: The TMS 100 will support the display and entry of the TMS "remarks" based on the remarks type. Proposed remarks types include administrative, troubleshooting, or combination of the two. Fulfillment of this requirement will provide users with the ability to filter the remarks display based on their function or desired activity. Fulfillment of this requirement will also serve the need to filter the remarks customers and/or vendors view by negating the need for the long distance carrier's personnel to enter additional special remarks.

Authorization: Authorization transactions are supported by the electronic interface with enough flexibility built in to allow telephone requests to be handled on an exception basis.

To summarize, the disclosed electronic interface will support two processing streams for the trouble management system 100:

A. Outbound—the creation and maintenance of trouble tickets located on an external Agent's systems. This includes the support of the following activities and functions:

Open a ticket
Change a ticket
Add Remarks to a ticket
Activity Processing
  Close a ticket
  Cancel a ticket
  Escalate a ticket
Request ticket status B. Inbound—the creation and maintenance of trouble tickets on the TMS 100 by external Agents. This includes the support of the following activities and functions:

Open a ticket
Change a ticket
Add Remarks to a ticket
Activity Processing
  Close a ticket
  Cancel a ticket
  Refer out a ticket
  Get status of a ticket
  Escalate a ticket
Display a ticket
Display activity
Display Remarks
Display Status Outbound processing will occur in the following manner:

1. A trouble ticket has been opened on the system.
2. A Service Center evaluates the ticket and determines the location of the problem.
3. The Service Center refers the ticket to the organization it believes can solve the problem.
4. When the trouble is referred to an internal organization, the TMS 100 will process the problem internally.
5. When the trouble is referred to an external AGENT organization, the TMS 100 will initiate a process to create the trouble ticket on the Agent's system.
6. The data will be formatted to the Agent's requirements, providing that the requirements conform to the T1M1 standards.
7. The Communication Facility, i.e., the gateway 104, will transmit the data to the external Agent via the communications protocol.
8. Various acknowledgements and responses will be processed by the system via the Inbound process.

Inbound Processing will occur in the following general manner:

1. Inbound messages arrive to a long distance carrier through the connection with the external Agent. The message is verified by the Communications Facility, i.e., the gateway 104, to ensure that it is arriving from an authorized source.
2. The Communications Facility, i.e., the gateway 104, translates the message into a format that can be read by the TMS Standardized Interface 102.
3. The TMS Standardized Interface 102 will convert the data into the TMS format.
4. The message will be edited.
5. The TMS 100 will process the message.
6. Various acknowledgements and responses will be passed back to the Agent via the Outbound process.

Since those skilled in the art can modify the disclosed specific embodiment without departing from the spirit of the invention, it is, therefore, intended that the claims be interpreted to cover such modifications and equivalents.

What is claimed is:

1. An interface for electronically exchanging trouble information between a long distance carrier network and a local exchange carrier network, comprising:

a first trouble administration system for managing a trouble ticket created in response to a notification of a problem in a telephone service or product, responsive to said first trouble administration system, a first interface for converting data in said trouble ticket to a first data format for said first trouble administration system and for converting said trouble ticket data to a second data format, responsive to said first interface, first processing means including first programming means for converting said data in said second data format to a third data format, and transferring said data in said third data format via a communications medium; and responsive to said first processing means, second processing means which includes second programming means to transfer said data via a second interface for processing by a second trouble administration system, wherein said data representing said trouble ticket is processed within said networks to initiate a subsequent repair of said problem.

2. The interface according to claim 1, wherein said second data format comprises ANSI T1.227 and T1.228 standards.

3. The interface according to claim 1, wherein said third data format comprises a common management information protocol based on Open System Interconnection established by International Standards Organization.

4. The interface according to claim 1, wherein said communications medium comprises a packet-switched data network.

5. The interface according to claim 1, wherein said third data format is compatible with a plurality of packet-switched X.25 data networks comprising a data link X.75.

6. The interface according to claim 1, wherein said first interface further comprises means for validating said trouble information incoming and outgoing of said interface, means for re-sending said trouble information if an original transmission fails, means for verifying an identity of an agent, and means for controlling access to a multiple of local data stores.

7. The interface according to claim 1, wherein said first trouble administration system manages said trouble ticket by means for creating a report on said trouble ticket, means for modifying said report on said trouble ticket, means for receiving a status on processing said trouble ticket from said second trouble administration system, means for verifying a repair completion by said second trouble administration system, and means for cancelling said report on said trouble ticket.

8. A method for electronically exchanging a trouble information between a long distance carrier network and a local exchange carrier network, comprising:

opening a trouble ticket in a first trouble administration system in response to a notification of a problem;

determining a location of said problem;

in response to said problem occurring on another network, referring said trouble ticket to a second trouble administration system of said other network by converting said trouble ticket into a common data format and transmitting via a communications medium to said second trouble administration system.

9. The method according to claim 8, further comprising acknowledging receipt of said trouble ticket and responding with a status report by said second trouble administration system.

10. The method according to claim 8, further comprising modifying said trouble ticket, receiving a status on processing said trouble ticket, and verifying a repair completion of said trouble ticket.

* * * * *